3,385,035
CHROMATOGRAPHIC COLUMN
Marie-Blanche Dixmier, Sceaux, Bernard Roz, Antony, and Georges Guiochon, Paris, France, assignors, by mesne assignments, to Compagnie Francaise Thomson Houston-Hotchkiss Brandt, Paris, France, a corporation of France
Filed July 5, 1966, Ser. No. 562,794
Claims priority, application France, July 16, 1965, 24,875, Patent 1,451,420
10 Claims. (Cl. 55—386)

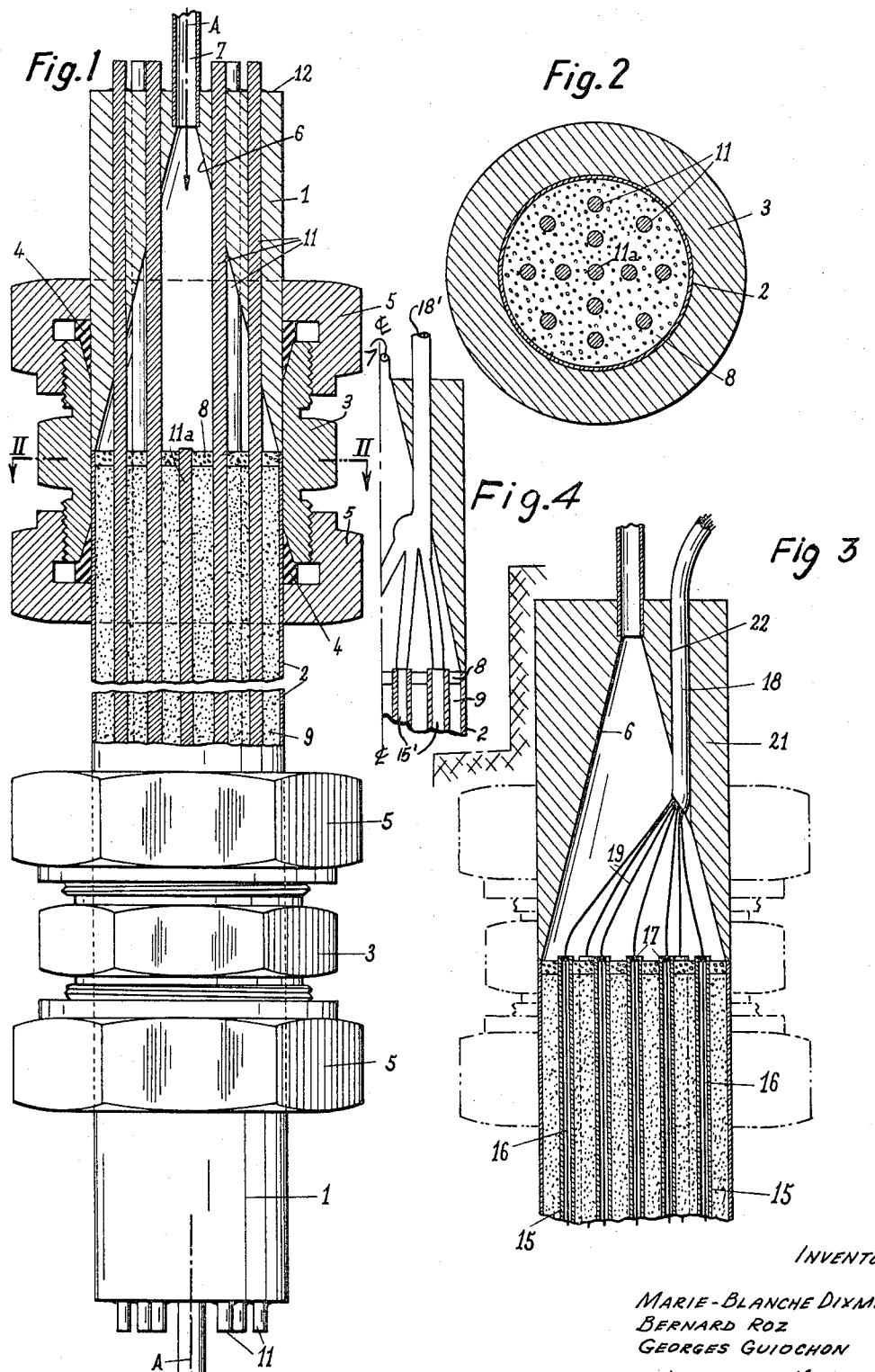

ABSTRACT OF THE DISCLOSURE

The chromatograph casing contains a chromatographic filler which has embedded therein a plurality of elongated elements to improve dispersion of solute. The elongated elements can be heatable and may be of copper, glass, etc.

---

This invention relates to an improved chromatographic column, permitting the treatment of considerable quantities of products, particularly with a view to recovering the solute ("preparatory" chromatography).

It is known that the fractionation by chromatographic techniques of products of great purity on the gram scale or more necessitates the use of columns having a relatively large diameter, this diameter depending in other respects on the complexity of the mixture to be separated, the degree of purity and the rate of production required. Columns having a diameter from 1 cm. to several cms. are at present used.

Beyond diameters of 1 cm., it is known that the performance of the columns obtained by the conventional methods of filling notably diminishes, even when these columns are used with very small charges. Notwithstanding, as capacity of the columns increases with their section, it is necessary to manufacture columns with large sections in order to obtain a substantial capacity. A compromise must be found between the efficacy of separation and the capacity of load; it will be all the more satisfactory that the columns with a large diameter are more efficient.

One of the causes of this phenomenum results from the fact that for considerable diameters there is produced a non-uniform distribution of the powdery material filling the column, said material being hereinafter termed filler. In fact, as the filler is constituted by a screen powdery mixture, the largest particles tend to accumulate in the vicinity of the wall, the density increasing towards the center of the column where the permeability of the porous medium is therefore less. This peculiarity introduces a transverse velocity gradient in the dynamic medium (carrying medium). Experience has shown that the relationship of the velocities at the circumference and at the axis of the column can reach 1.4.

This velocity difference causes a considerable deformation of the zones which assume a bowl-shaped profile and leads to a considerable enlarging of the peaks.

It has been thought to remedy this disadvantage by mounting in parallel a set of identical columns of small section but this method does not give satisfaction notably by virtue of practical difficulties of accomplishment and divergences of results given by the various columns. In the same way the filling of the column in varying regime with a view to making good the radial grading of the particles of different dimensions, is insufficiently efficacious.

It has also been proposed to manufacture the columns with radially converging blades, integral with the outside wall and stopping at a certain distance from the axis in such a way as to create a succession of adjacent sectors. Nevertheless sectors of rather considerable section to be efficient limit the speed of the radial exchanges in such a way that the heterogeneities between each sector lead to disadvantages similar to those observed with the columns in parallel.

Another disadvantage of columns with a large diameter used in preparatory chromatography is as follows: the overload of the column which is necessary to increase the yield brings with it variations of axial temperature, occasionally considerable, due to the variation of enthalpy accompanying the evaporation phenomena of the solute.

The result for columns of large diameter is that the passage of a peak is accompanied by a considerable thermal gradient, positive at the head of the peak and negative at the tail. This phenomenum favours therefore an enlargement of the peak and causes a drop in efficiency of the column with an increase in charge. These thermal gradients are all the more considerable in that the filler normally used in chromatography in the gaseous phase (refractory brick powder) is a very bad conductor of heat. This property leads to the appearance of very considerable thermal gradients from the center of the column to its circumference, when it is desired to undertake chromatography at a programmed temperature. Particularly in this latter technique the process is limited to temperature rises at most equal to several tenths of a degree C. per minute whilst changes of the order of 5° C. per minute are desirable.

An object of the invention is to overcome the disadvantages and limitations which have just been described.

In accordance with the present invention the chromatographic column which is mainly of the type having a diameter of at least 2 cm., with a view to preparatory operations is characterized in that it comprises elongated elements, separated one from another and from the wall of the column, directed parallel to the axis of the column and which are disposed in the filler.

This arrangement allows the greatest distance from one point of the filler to a wall element to be reduced to a sufficiently low value to diminish the importance of the permeability gradients of the filler along a similar section perpendicular to the axis.

Thus the nominal efficiency of the column and its efficiency under load can be increased. Particularly it can be ensured that the number of elements and their section are such that the distance from one point of the filler to the surface of the adjacent elements does not substantially exceed the diameter normally adopted for analytical columns (of the order of about 4 mm.).

In practice the total section of the elongated elements can be approximately from 6 to 20% and preferably from 8 to 10% of the straight section of the column, these figures being merely indicative in any case.

Preferably the elongated elements are of a metallic nature having a constant section along the whole height of the column and are mainly made of a metal, such as copper, having a good thermal conductivity.

Thus the width of the thermal signals accompanying the passage of a band of solute can be reduced, which contributes to increasing the efficiency of the column.

The elongated elements can be arranged to allow heating of the filled in situ, which greatly increases the possibilities of chromatography at a programmed temperature even in columns with a large section.

The invention will now be described in greater detail by way of example with reference to the accompanying drawings, in which:

FIGURE 1 shows a view partially cut away along the axis, with broken views of a chromatographic column in accordance with the invention.

FIGURE 2 shows a section taken along the line II—II in FIGURE 1.

FIGURE 3 shows a partial view cut-away along the axis similar to FIGURE 1, showing the upper part of a column in a modification.

FIGURE 4 is a part view of the column, taken similar to FIGURE 3 with only one half shown, and illustrating fluid heating.

In the embodiment illustrated in FIGURES 1 and 2 can be seen nozzles 1, for example of brass, of a chromatographic column the body 2 of which is copper or other metal, or chromatographic glass.

Each nozzle 1 is fixed fluid-tight into the body 2 by means of a neck 3 with double thread conical packings 4, and gland nuts 5.

On the inside of the nozzle 1 is disposed an admission chamber in the form of a truncated cone 6, fed by a fluidtight tube 7 and which opens at a wall 8 of sintered metal serving as a plug for the filling material or filler of the body 2. This filler 9 may consist, for example, of powdery debris of refactory brick, of a grain-size between 0.21 and 0.25 mm. impregnated with up to 20% of silicone rubber.

In accordance with the invention there is provided inside the column a number of elongated elements 11, constituted in the present case, by cylindrical rods placed regularly around the axis A—A of the column as FIGURE 2 shows.

At each end of the column, the rods 11 pass through the porous wall 8 in a fluidtight manner and also the chamber 6 and the walls of the nozzle 1 and slightly project beyond the end surface 12 of this nozzle. The fitting is ensured by a thin coating of solder. Only the rod 11a disposed along the axis A—A is terminated flush with the wall 8.

The rods 11 can be constituted by solid cylindrical rods of glass, alumina, metal (preferably copper) of constant section.

Copper is preferred by reason of its high thermal conductivity. The total section of the elements 11 represent, as has already been said 6 to 20% of the free section of the column 2. For example, for a column 40 mm. in diameter, 13 rods 3 mm. in diameter can be provided, stretching 1 metre (i.e. a reduction of the passage section of 8%). In these conditions no point of the filler 9 is more than 4 mm. from a metallic surface. This obviates a radial granulometric grading of the filler 9 particles, and also considerably facilitates radial and axial thermal exchanges, the thermal conductivity of copper being several thousand times greater than the material of the filler 9.

Experience has shown that a column arranged in this way has an overload capacity at least double that of a normal column of the same length, that is to say that the same efficiency is obtained for a double charge of the sample. Furthermore the efficiency with a small charge is greater by about 15%.

The presence in the filler 9 of the parallel rods of copper diminishes the width of the thermal deviations accompanying the passage of a solute band, which is one of the factors leading to the verified improvement.

The improvements which are the object of the invention are applicable to the various types of preparatory chromatography: gas-liquid, gas-solid, liquid-liquid, liquid-solid.

In accordance with another embodiment of the invention it is possible to use elongated elements crossing the column to ensure a heating of the filler 9. Such an arrangement is shown in FIGURE 3. The elongated elements here comprise insulating tubes 15, impermeable to the fluids used for chromatography. The tubes 15 are axially traversed by electrical resistance wires 16 which penetrate by means of fluidtight plugs 17. The wires 16 are fed by a multi-filament cable 18 the filaments of which are shown schematically as 19. The cable 18 traverses the nozzle 21 by a fluidtight conduit 22.

When the resistance wires 16 are fed by electric current they heat the filler 9. The envelope 2 can receive means of external heating (steam jacket, worm coil, spiralled electric resistance etc).

In such a way programming of the temperature can be undertaken at changes of the order of 5 to 10° C. per minute which permits the application of programmed temperature chromatography in the preparatory field.

Of course it would not be beyond the scope of the invention to vary the described constructions in carrying out the method. Thus in the case of FIGURE 1 the rods 11 can be replaced by a bundle of relatively supple wires, stretching parallel or by hollow tubes (for example of quartz).

In the case of FIGURE 4, the tubes 15' could have a heating fluid running through them (hot water or steam), the inlet cable of FIGURE 3 then being replaced by a suitable supply tube 18'. Of course with heating using resistance wires 16, the multi-filament cable 18 could be placed in the axis of the tube 7 to avoid any dissymmetry for the fluid in the chamber 6.

We claim:

1. A chromatographic column comprising a tubular casing member, an inlet at one end of said casing and an outlet at the opposite end of said casing, a chromatographic filler disposed in said casing intermediate said inlet and said outlet, and a plurality of elongated cylindrical elements arranged in said casing embedded in said filler, said elements being disposed substantially parallel to said casing and separated one from another and from said casing, and a plugging member arranged in the casing beneath the inlet and above the filler to effect a fluidtight seal between the filler and the surrounding casing, said elongated elements being arranged to pass through said plugging member in a fluid tight manner.

2. A chromatographic column according to claim 1, wherein said casing has an interior surface and said elements have exterior surfaces, and the number of said elongated elements is such that the distance between the adjacent surfaces is substantially uniform and does not substantially exceed 4 millimeters.

3. A chromatographic column according to claim 1, wherein said elongated elements are hollow and means are provided for circulating a heating fluid through said hollow elements.

4. A chromatographic column according to claim 1, wherein said elongated elements are hollow, electrical heating resistors, are located within said hollow elements, and means are provided for feeding said resistors with electric current.

5. A chromatographic column according to claim 1, wherein the aggregate of the cross-sections of said elongated elements represents from 6% to 20% of the cross-section of the cylindrical portion of said casing.

6. A chromatographic column according to claim 5 wherein the aggregate of the cross-sections of said elongated elements represents from 8% to 10% of the cross-section of the cylindrical portion of said casing.

7. A chromatographic column according to claim 1 wherein said elongated elements are of metal.

8. A chromatographic column according to claim 1 wherein said elongated elements are of constant section along the whole height of the column.

9. A chromatographic column according to claim 1 wherein said elongated elements are comprised of solid rods.

10. A chromatographic column according to claim 1 wherein said elongated elements comprise hollow tubular members having metallic wires passing therethrough.

References Cited

UNITED STATES PATENTS 3,250,058  5/1966  Baddour _____ 55—197 X

FOREIGN PATENTS 636,078  2/1962  Canada.

OTHER REFERENCES

Japanese patent application 19,046/63, September 1963.

REUBEN FRIEDMAN, *Primary Examiner.*

J. L. DE CESARE, *Assistant Examiner.*